(12) United States Patent
Rosian

(10) Patent No.: US 9,788,690 B2
(45) Date of Patent: Oct. 17, 2017

(54) COOKING APPARATUS AND ACCESSORIES

(71) Applicant: Marian Silviu Rosian, Hornsby (AU)

(72) Inventor: Marian Silviu Rosian, Hornsby (AU)

( * ) Notice: Subject to any disclaimer, the term of this patent is extended or adjusted under 35 U.S.C. 154(b) by 11 days.

(21) Appl. No.: 14/915,324

(22) PCT Filed: Jul. 22, 2014

(86) PCT No.: PCT/AU2014/000745
§ 371 (c)(1),
(2) Date: Feb. 29, 2016

(87) PCT Pub. No.: WO2015/035441
PCT Pub. Date: Mar. 19, 2015

(65) Prior Publication Data
US 2016/0206149 A1  Jul. 21, 2016

(30) Foreign Application Priority Data
Sep. 16, 2013  (AU) ................................ 2013903550

(51) Int. Cl.
*G07F 9/10* (2006.01)
*A47J 37/07* (2006.01)

(52) U.S. Cl.
CPC ....... *A47J 37/0786* (2013.01); *A47J 37/0704* (2013.01)

(58) Field of Classification Search
CPC .......................... A47J 37/0704; A47J 37/0786
USPC .... 126/25 R, 41 R, 152 R; 15/21.1, 77, 160, 15/246; 99/357
See application file for complete search history.

(56) References Cited

U.S. PATENT DOCUMENTS

| | | | | |
|---|---|---|---|---|
| 4,979,255 A | * | 12/1990 | Buchnag | A47J 37/0786 15/256.5 |
| 5,167,803 A | * | 12/1992 | Newton | B01D 29/01 210/141 |
| 5,259,299 A | * | 11/1993 | Ferraro | A47J 37/0713 99/340 |
| 2007/0056577 A1 | * | 3/2007 | Chang | A47J 37/0713 126/25 R |

(Continued)

FOREIGN PATENT DOCUMENTS

| | | |
|---|---|---|
| DE | 24 62 071 A1 | 12/1975 |
| JP | 2006-263414 A1 | 10/2006 |
| JP | 2006263414 | * 10/2006 |

OTHER PUBLICATIONS

International Search Report Corresponding to PCT/AU2014/000745 dated Oct. 13, 2014.

(Continued)

*Primary Examiner* — Dana Ross
*Assistant Examiner* — Joseph Iskra
(74) *Attorney, Agent, or Firm* — Davis & Bujold PLLC; Michael J. Bujold

(57) ABSTRACT

A cooking apparatus is described including: at least one grill element including a cooking surface for supporting foodstuffs which in use are heated on the cooking surface; and a cleaning device for cleaning at least a portion of the cooking surface, the cleaning device including a surface cleaning element and a movement mechanism, the movement mechanism being arranged to move the cleaning element across the cooking surface; and at least one motor for driving the movement mechanism.

13 Claims, 21 Drawing Sheets

(56) References Cited

U.S. PATENT DOCUMENTS

2009/0090348 A1* 4/2009 Contarino, Jr. ....... A47J 37/074
126/25 R
2011/0302729 A1* 12/2011 Peacocke ............ A47J 37/0786
15/4

OTHER PUBLICATIONS

Written Opinion Corresponding to PCT/AU2014/000745 dated Oct. 13, 2014.
International Preliminary Report on Patentability Corresponding to PCT/AU2014/000745 dated Mar. 16, 2015.

* cited by examiner

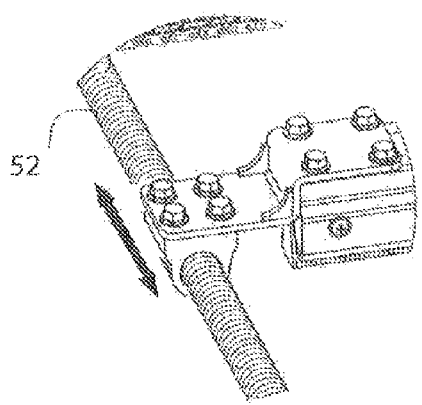
Fig. 4A
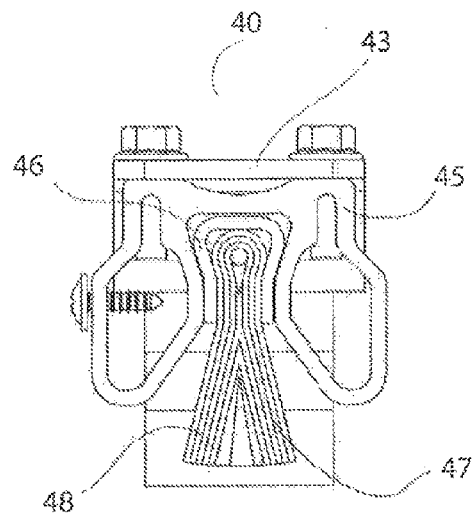
Fig. 4B
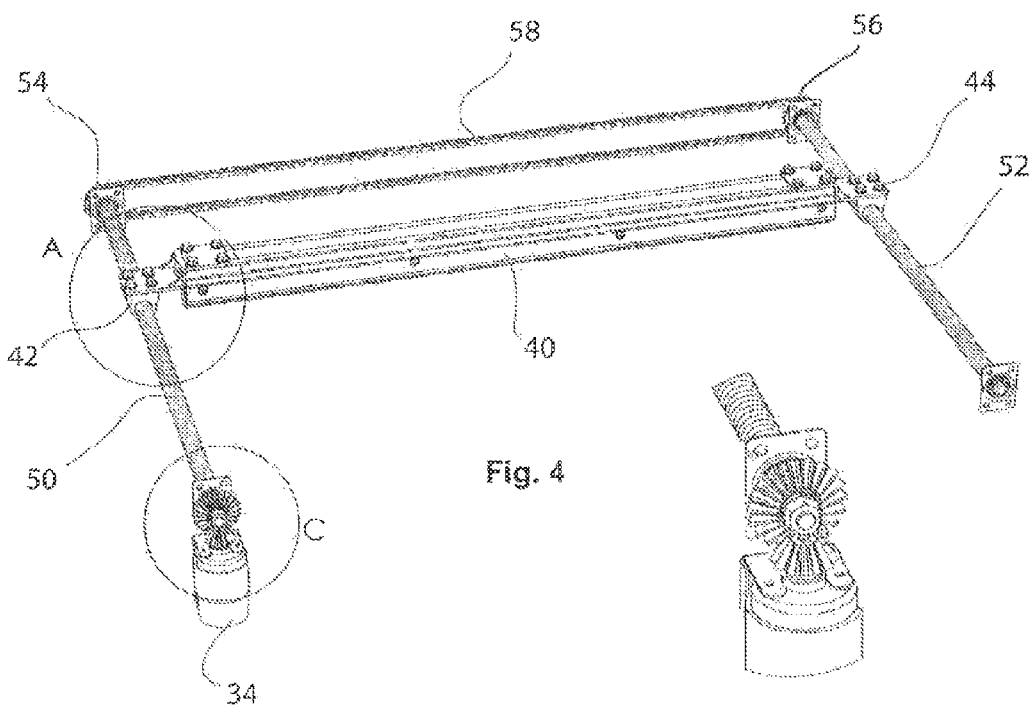
Fig. 4
Fig. 4C

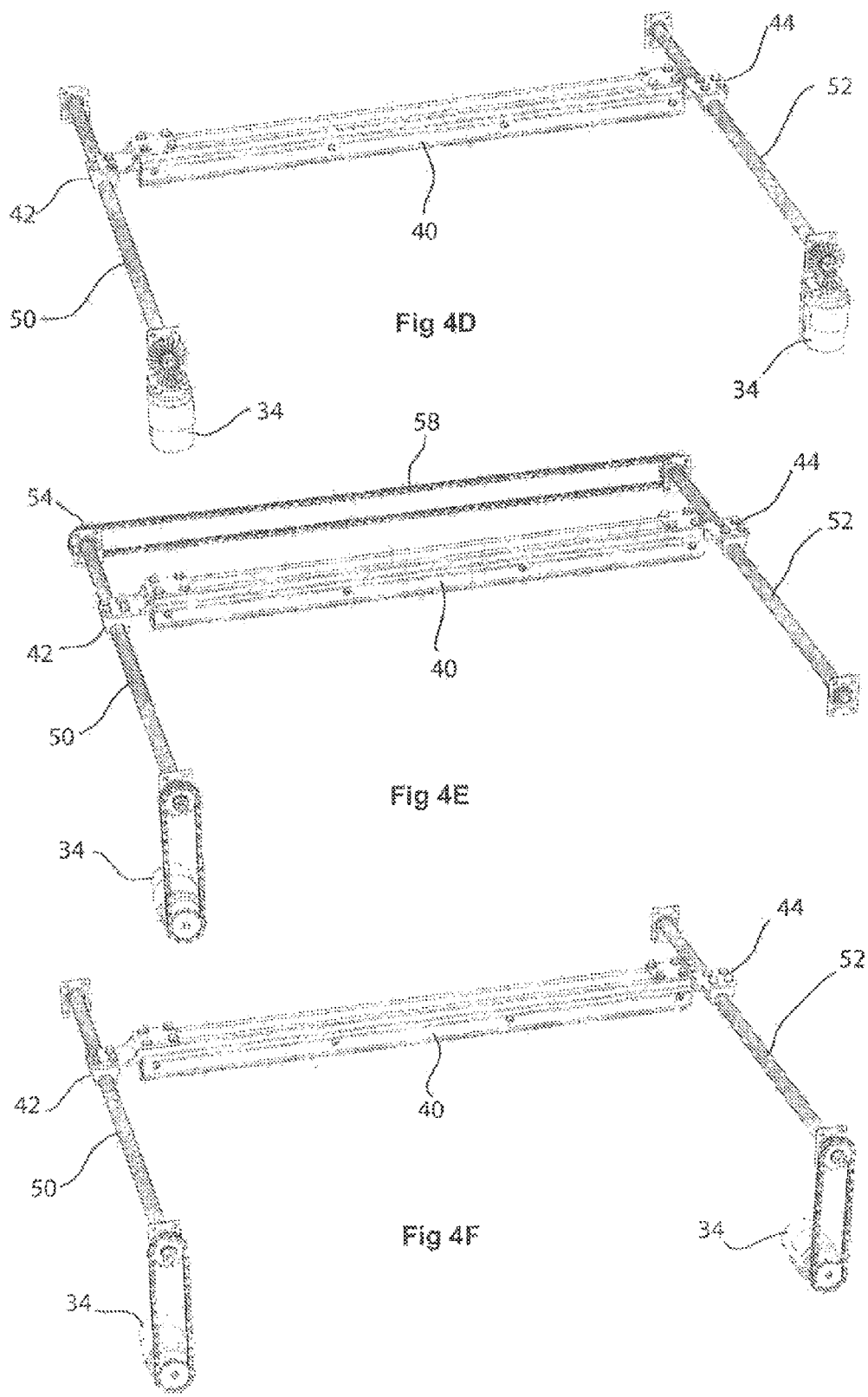

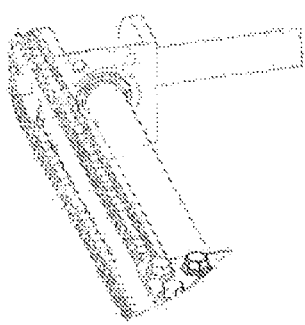
Fig. 5A
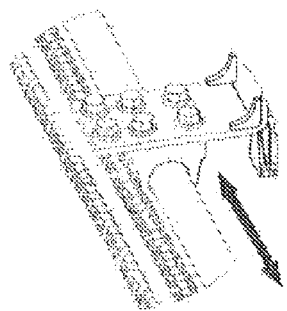
Fig. 5B
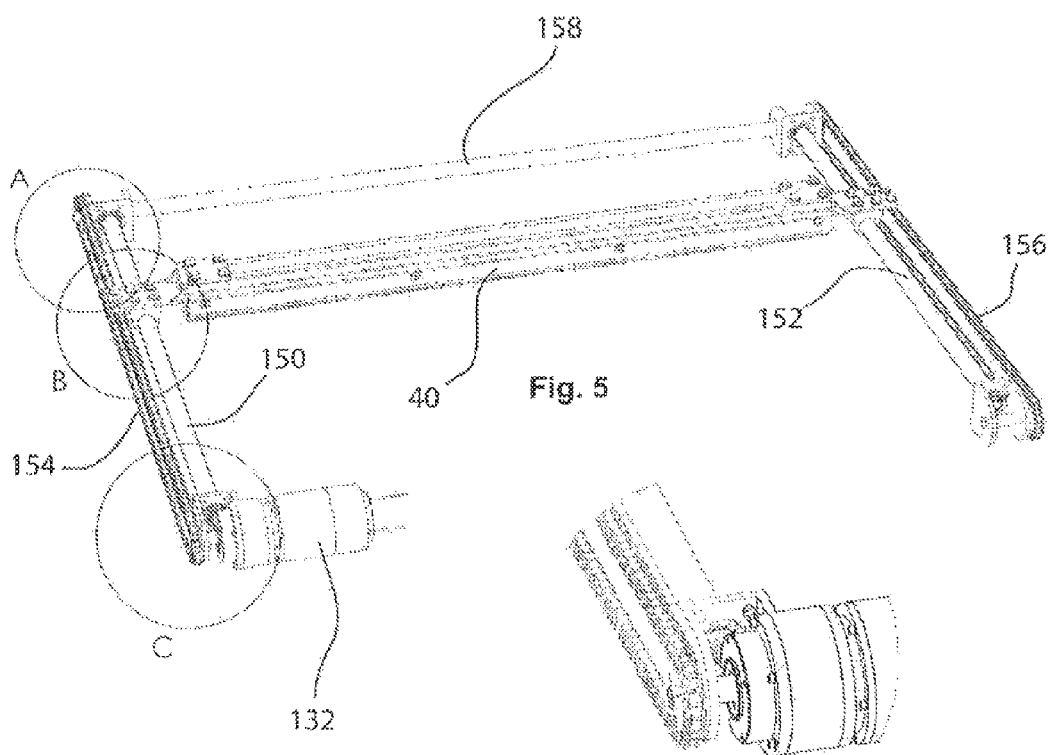
Fig. 5
Fig. 5C

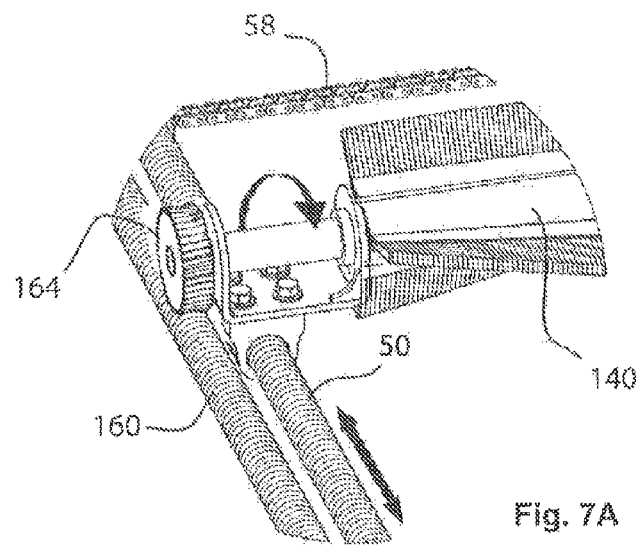
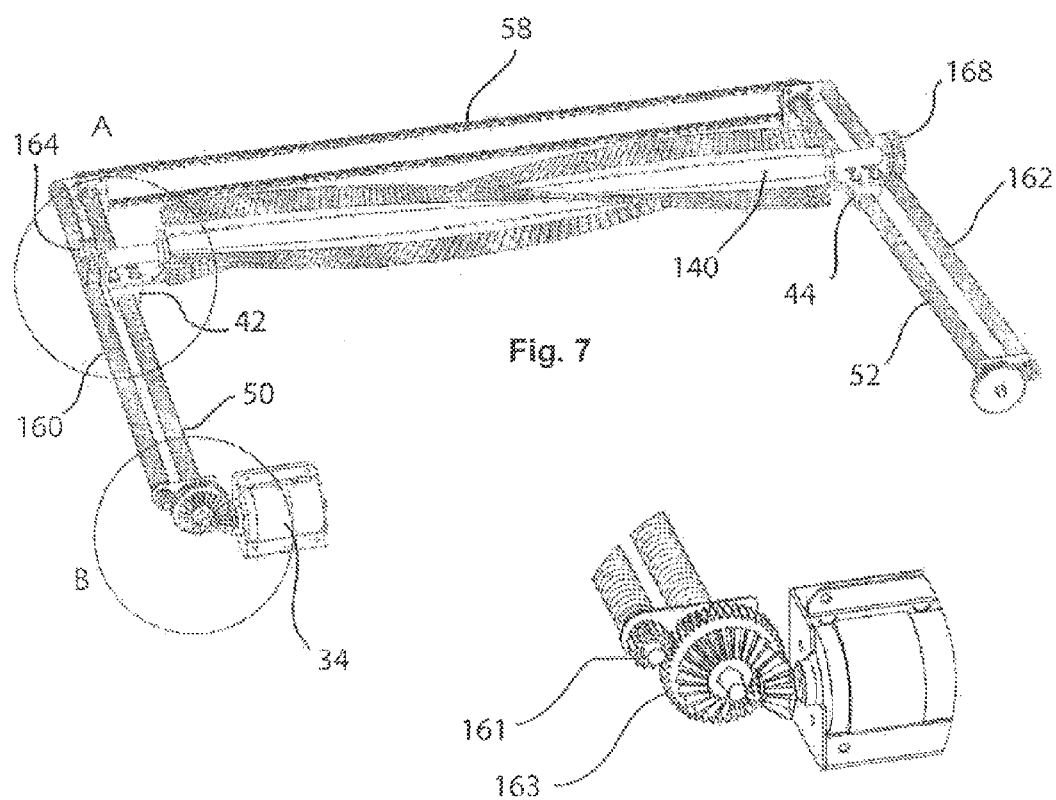

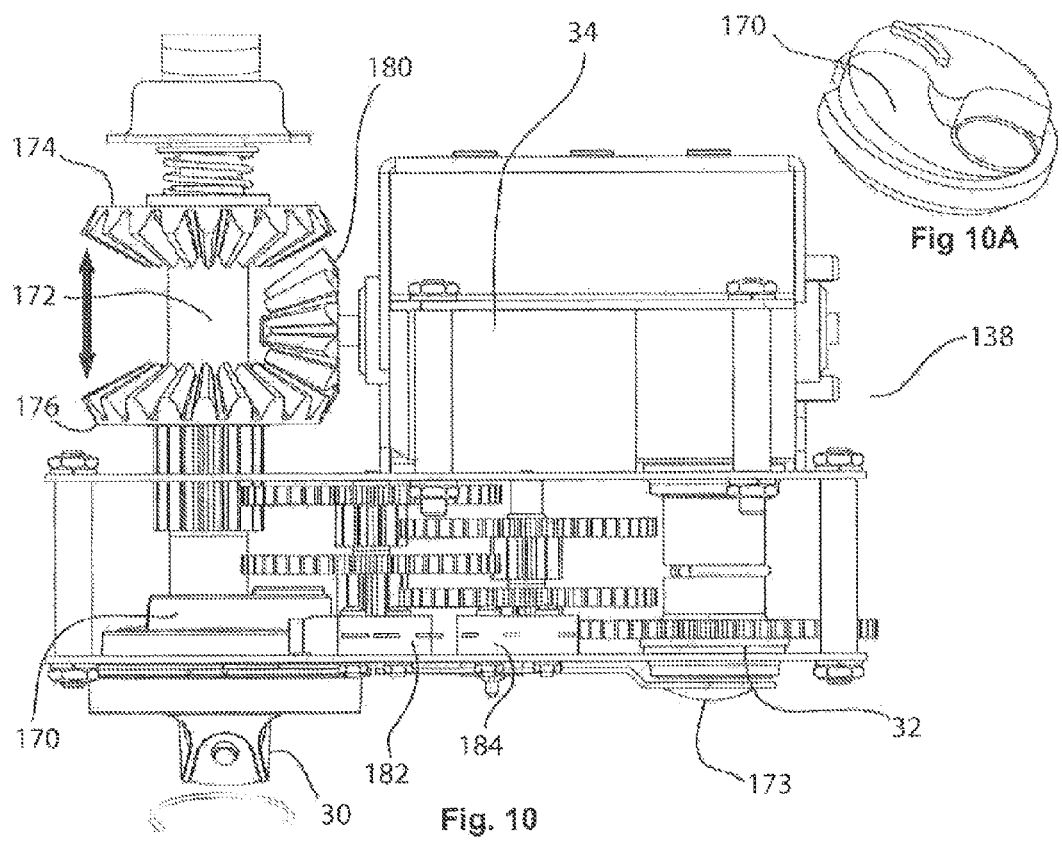
Fig. 10
Fig 10A
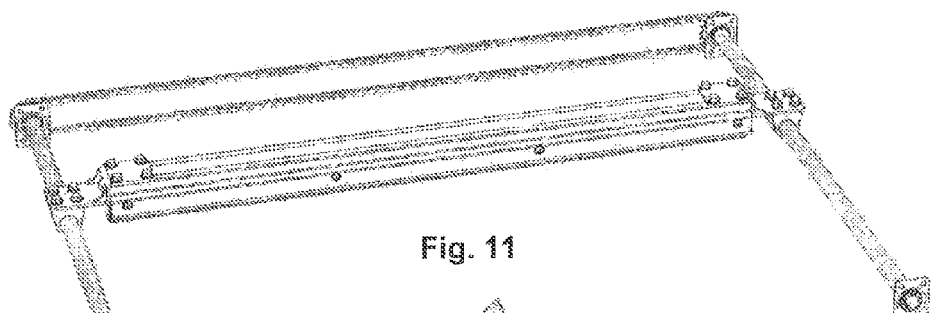
Fig. 11
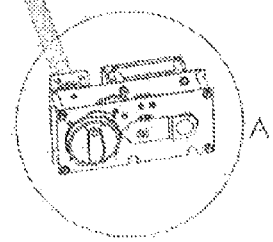
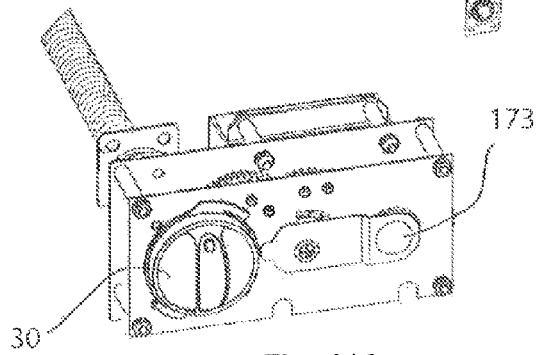
Fig. 11A

COOKING APPARATUS AND ACCESSORIES

TECHNICAL FIELD

The present invention relates to cooking apparatus and accessories and particularly relates to outdoor cooking apparatus such as grills and barbeques and accessories therefor.

SUMMARY OF THE INVENTION

In a first aspect the present invention provides a cooking apparatus including: at least one grill element including a cooking surface for supporting foodstuffs which in use are heated on the cooking surface; and a cleaning device for cleaning at least a portion of the cooking surface, the cleaning device including a surface cleaning element and a movement mechanism, the movement mechanism being arranged to move the cleaning element across the cooking surface; and at least one motor for driving the movement mechanism.

The cleaning element may include at least one brush.

The cleaning element may be generally elongate and is affixed at its ends to portions of the movement mechanism which are disposed at opposite sides of the cleaning surface.

The opposite portions of the movement mechanism may be joined by a mechanical linkage so that movement of one side of the mechanism is translated to equivalent movement in the other side of the mechanism.

The opposite portions of the movement mechanism may each be driven by their own motor.

The movement mechanism may be further arranged to rotate the cleaning element as it moves across the cleaning surface.

The movement mechanism may include lead or ball screws and the cleaning element is mounted to the lead or ball screws by way of threaded blocks or ball nuts.

The apparatus may further include at least one switch to detect the position of the cleaning device.

The cleaning element may be slidably mounted on rails and the movement mechanism includes drive belts or chains which are arranged to move the cleaning element along the rails.

The at least one motor may be mounted below the movement mechanism and drives the movement mechanism by way of a drive belt or chain.

The at least one motor may be further arranged to drive an output dog which can be used to drive one or more removable accessories.

The apparatus may further include a removable accessory which is connectable to the output dog by way of a flexible drive cable or by direct engagement.

The removable accessory may include any one of a rotisserie, an arrangement of rotating skewers, an arrangement of rotating cylinders, a stirring device or a hand held cleaning device.

In a second aspect the invention provides a grill arrangement for a cooking apparatus, the grill arrangement including: an array of grill bars separated by longitudinal grill apertures; and an array of channels disposed beneath the grill apertures; the channels are separated by channel apertures, the channel apertures being disposed beneath the grill bars; the channels are mounted in a sloped orientation; in use, the channels receive cooking liquids produced during cooking food on the grill bars and guide the liquids away from the cooking area; at least some of the grill bars include a longitudinal recess in their undersides; and wherein the longitudinal recesses are generally concave.

In a third aspect the invention provides a cooking apparatus according to the first aspect including a grill arrangement according to the second aspect.

BRIEF DESCRIPTION OF THE DRAWINGS

An embodiment of the present invention will now be described, by way of example only, with reference to the accompanying drawings, in which:

FIG. 4 shows the movement mechanism of the barbeque of FIG. 1 in isolation;

FIG. 4A is detail A of FIG. 4;

FIG. 4B is a cross sectional view of the cleaning device of FIG. 4;

FIG. 4C is detail B of FIG. 4;

FIG. 4D

FIG. 4E

FIG. 4F

FIG. 5 shows an alternative embodiment of a movement mechanism;

FIG. 5A is detail A of FIG. 5;

FIG. 5B is detail B of FIG. 5;

FIG. 5C is detail C of FIG. 5;

FIG. 7 shows a movement mechanism for use with the cleaning device of FIG. 6D;

FIG. 7A is detail A of FIG. 7;

FIG. 7B is detail B of FIG. 7;

FIG. 8 shows another embodiment of a movement mechanism for use with the cleaning device of FIG. 6D;

FIG. 9B is detail B of FIG. 8;

FIG. 10 shows an embodiment of a selector module for use in the barbeque of FIG. 1;

FIG. 10A is a perspective view of the cam element of the selector module of FIG. 10;

FIG. 11 shows the selector module of FIG. 10 in conjunction with the movement mechanism of FIG. 4;

FIG. 11A is detail A of FIG. 11;

DETAILED DESCRIPTION OF THE PREFERRED EMBODIMENT

Figure 1:
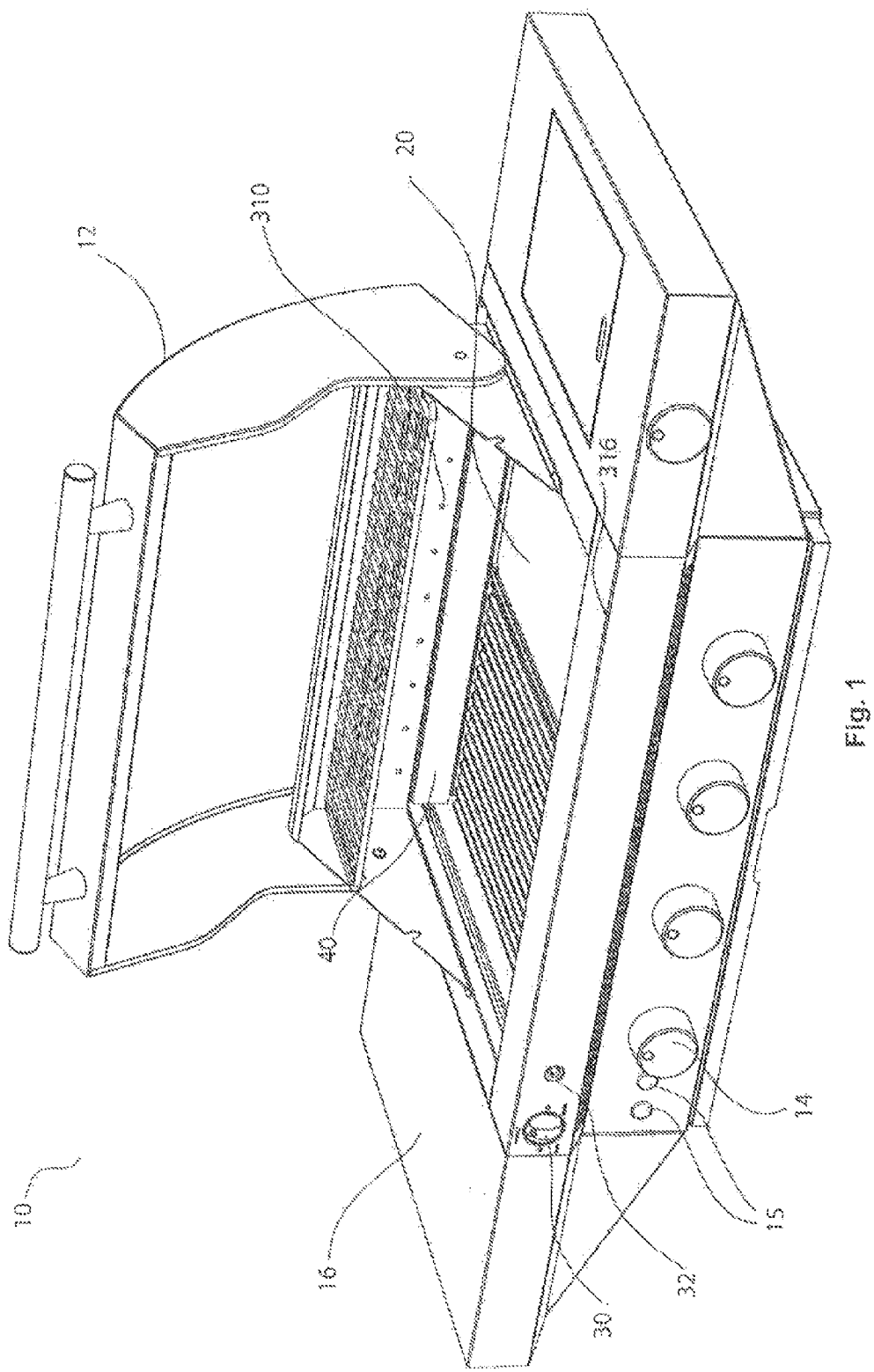
FIG. 1 is a perspective view of an embodiment of a barbeque according to the present invention.

Referring to FIG. 1, a cooking apparatus in the form of a gas barbeque 10 is shown including a pivoting hood 12, burner controls 14, a side shelf 16 a side burner and a grill plate 20. In use, gas burners located beneath the grill plate 20 provide heat which heats the bars of the grill plate. Foodstuffs are cooked on the top surface of the grill plate 20.

Barbeque 10 includes an additional selector control for controlling the operation of an internal drive mechanism which can be selectively used to power the movement of a cleaning device 40 which is shown in the stowed position located at the rear of the cooking surface or can be used to provide rotational output of output dog 32 which is used to drive various removable accessories which will described in due course.

Figure 2A:
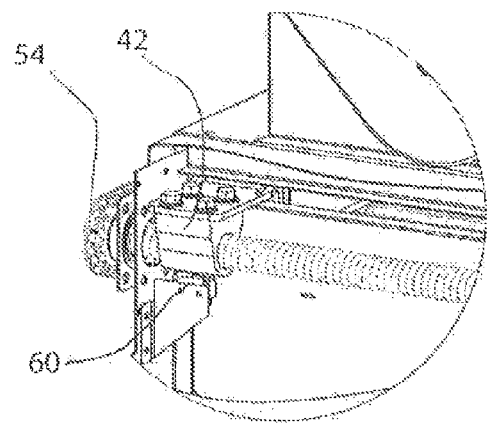
FIG. 2A is detail A of FIG. 2.
Figure 2:
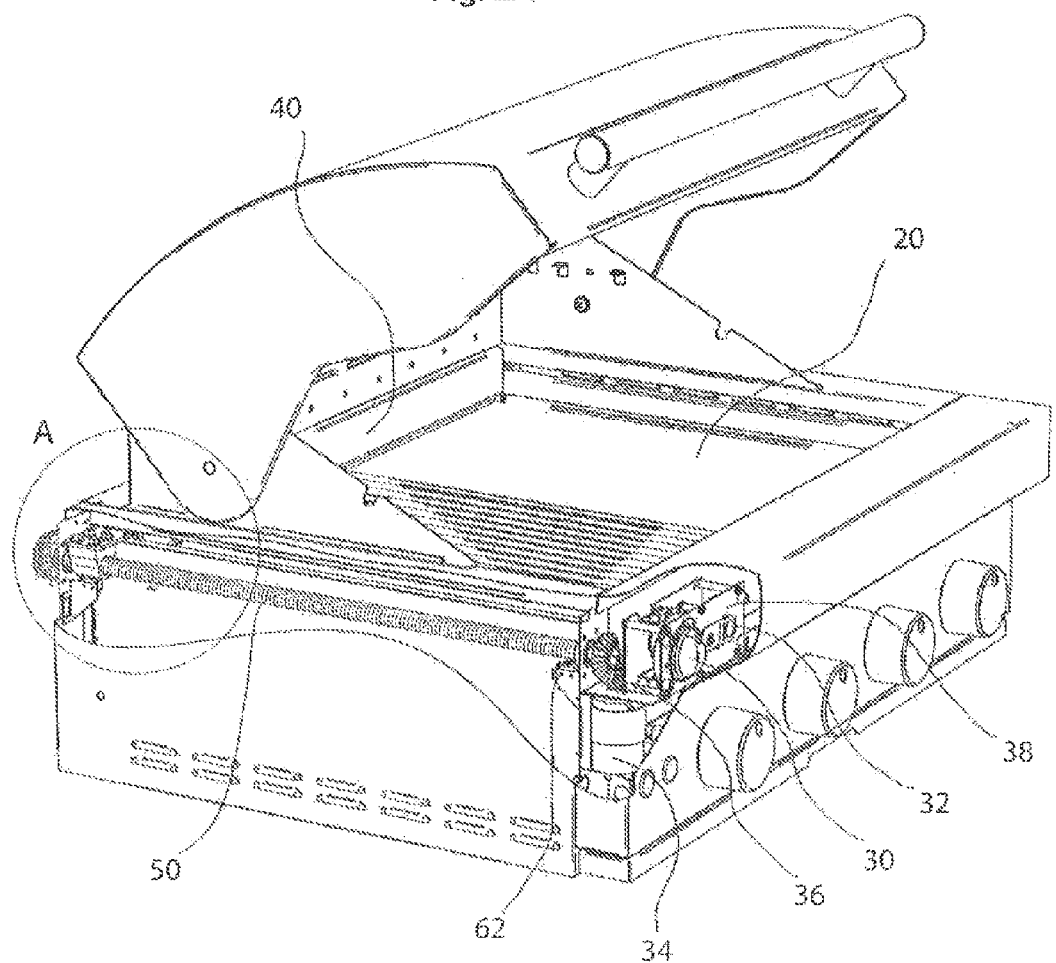
FIG. 2 is a partially cut away view of the barbeque of FIG. 1.
Figure 3A:
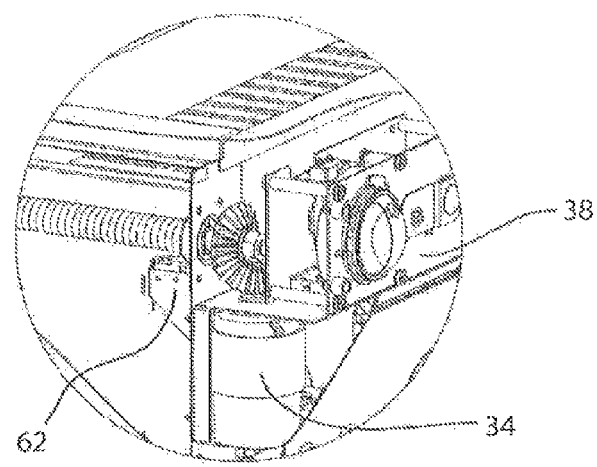
FIG. 3A is detail A of FIG. 3.
Figure 3:
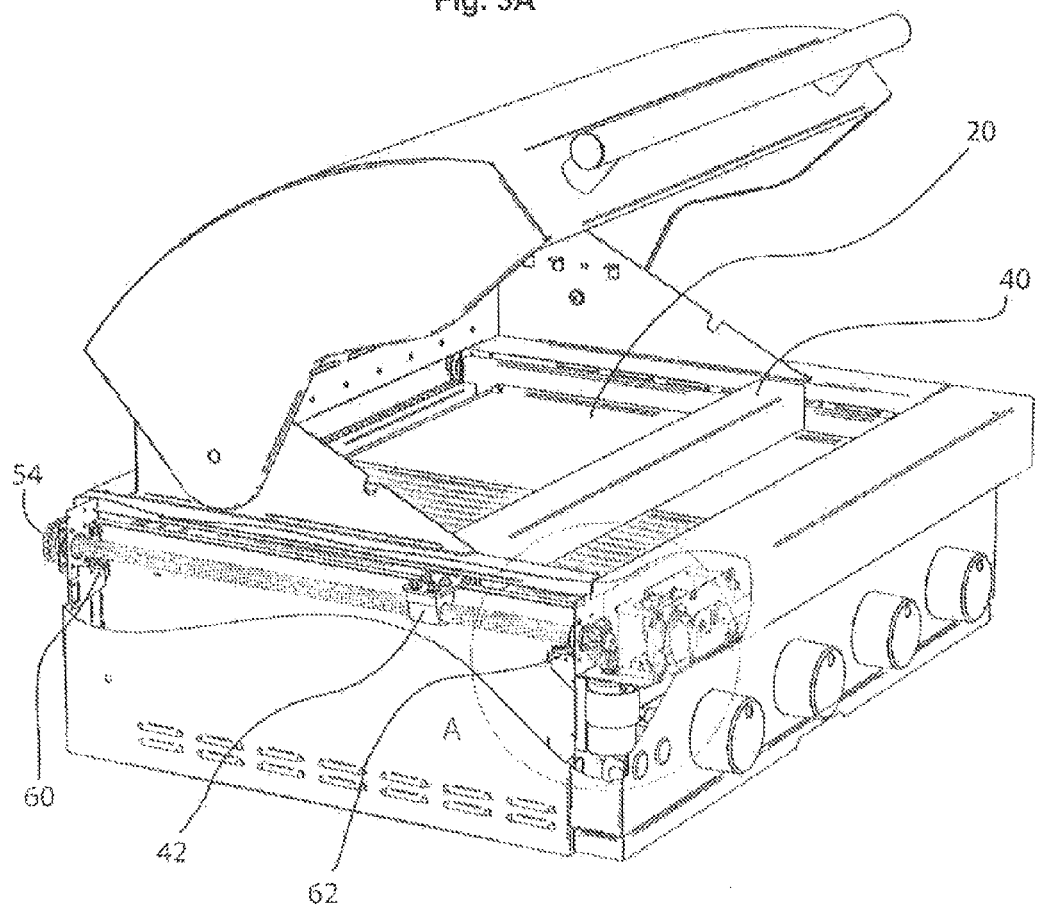
FIG. 3 shows the barbeque of FIG. 2 during a cleaning operation.

Referring to FIGS. 2 and 3, an electric motor 34 is mounted inside the barbeque 10 and has an output gear 36. The output gear 36 can be selected to drive either of a movement mechanism for the cleaning device 40 or output dog 32 by way of selector knob 30. The selector knob 30 and output dog 32 form part of selector module 38 which will described later in more detail.

As best seen in FIG. 4, the movement mechanism for the cleaning device 40 includes a pair of lead screws 50, 52 which are rotatably mounted at their ends in bushes fitted at the front and rear of the barbeque on either side of the grill plate 20. Threaded blocks 42, 44 are provided at each end of the cleaning device 40 which mount the cleaning device 40 to the lead screws 50, 52. A mechanical linkage in the form of gear 54, chain 58, and gear 56 translates rotational movement of lead screw 50 to equivalent movement of lead screw 52. Therefore, when motor 34 is activated, it causes simultaneous rotation of lead screws 50, 52 which in turn causes simultaneous lateral movement of threaded blocks 42, 44 along lead screws 50, 52 which results in lateral movement of the cleaning device 40 with respect to the grill plate 20 as seen in FIG. 3.

Referring to FIG. 3, microswitches 60, 62 are activated by the presence of threaded block 42. The microswitches are connected to a controller board (not shown) and enable detection of the position of the cleaning device 40.

As best seen in FIG. 4B, cleaning device 40 includes a brush 47 formed by an arrangement of brass or steel bristles 48 which are folded and crimped into a steel channel 46. The steel channel 46 is removably mounted in aluminium housing 45 to which is attached at either end a mounting plate 43 for mounting the housing 45 to the threaded blocks 42, 44. The brush 47 can therefore be replaced from time to time in case of wear of the brush.

The cleaning action of the brush 47 is activated by pressing two "start" buttons 15). This commences a logic sequence in the controller board which causes movement of the cleaning device 40 away from its home position, across the surface of the grill plate until activation of microswitch 62 indicates that the cleaning device 40 has reached its limit of travel. The motor 34 is then run in reverse to move the cleaning device 40 back across the grill plate 20 until the cleaning device activates microswitch 60. This operation may be repeated so that the cleaning device makes two or three passes back and forth over the grill plate.

As the cleaning device 40 moves across the grill plate, the bristles of brush 47 bear against the surface of the grill plate to loosen and remove food debris from on and in between the bars of the grill plate. Grill plate 20 is fixed in place to avoid movement of the grill plate during a cleaning operation.

The cleaning function of the barbeque is best operated just after finishing cooking some food items when the grill plate is still hot. Food debris is more easily removed at this time. Furthermore, cooking residue can have a corrosive effect on the grill plate, and so prompt cleaning of the grill plate extends the life of the grill plate. In prior art barbeques which require manual cleaning, the task of cleaning the grill plate is often left until a time well after consuming the food which has been cooked, by which time the food residue has cooled and hardened, and a degree of corrosion of the grill plate has taken place.

Referring to FIG. 4D, an alternative version of movement mechanism is shown. This embodiment differs to that shown in FIG. 4 in that the chain 58 has been dispensed with. The lead screw 52 is rotated by an additional synchronised motor 34.

Referring to FIG. 4E, an alternative version of movement mechanism is shown. This embodiment differs to that shown in FIG. 4 in that the motor 34 has been moved to a lower and therefore colder position where the motor is less likely to be damaged by heat from the barbeque. The motor 34 is mounted below the lead screw and drives the lead screw by way of a chain.

Referring to FIG. 4F, another alternative version of movement mechanism is shown. This embodiment is a combination of the embodiments shown in FIGS. 4D and 4E.

Referring to FIGS. 5 to 5C, an alternative embodiment of the movement mechanism is shown. In this embodiment, the cleaning device 40 is slidably mounted on a pair of rails 150, 152. Drive is provided by a geared motor 132 which drives a looped chain 154. Chain 154 in turn rotates shaft 158 which translates into equivalent movement of chain 156.

Figure 5E:
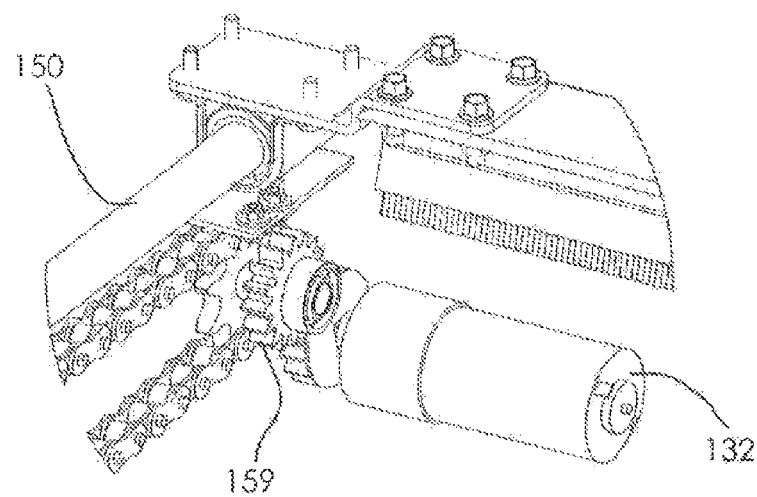
FIG. 5E is detail A of FIG. 5D.
Figure 5D:
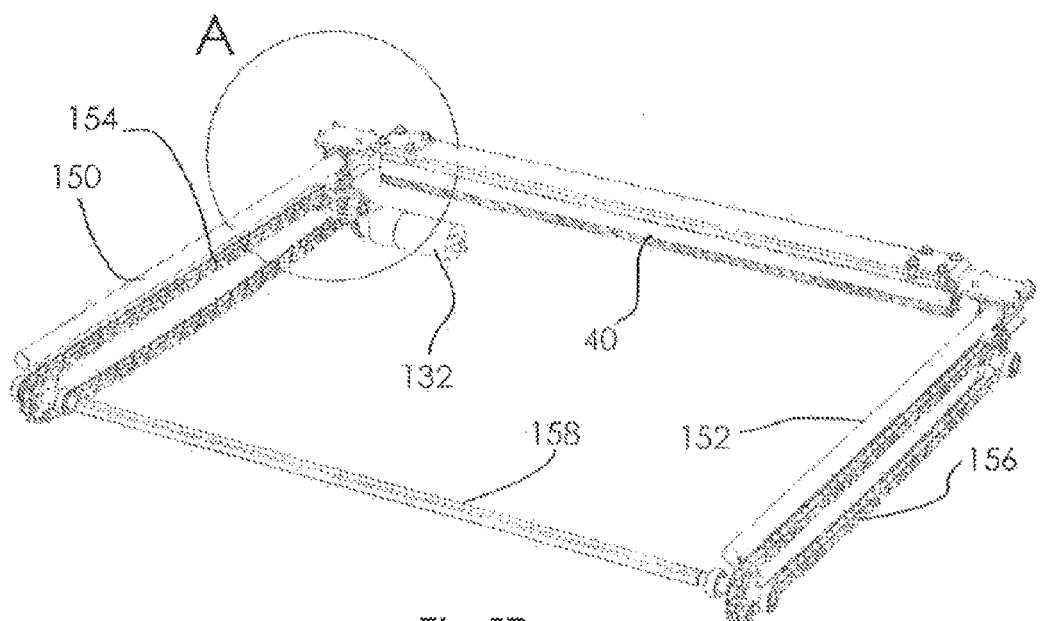
FIG. 5D shows an alternative embodiment of a movement mechanism.

Referring to FIGS. 5D and 5E, a further alternative embodiment of the movement mechanism is shown in which the geared motor 132 drives chain 154 via an intermediate idle gear 159.

Figure 6E:
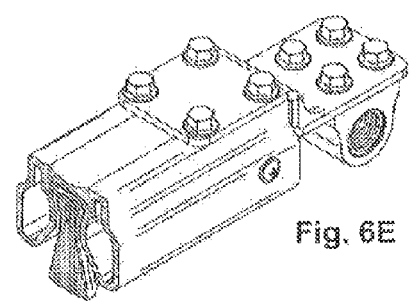
FIG. 6E is cross section A-A of FIG. 6A.
Figure 6F:
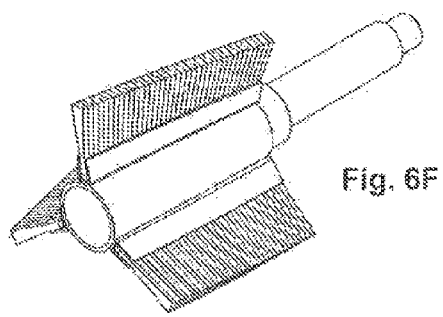
FIG. 6F is cross section B-B of FIG. 6D.
Figure 6A:
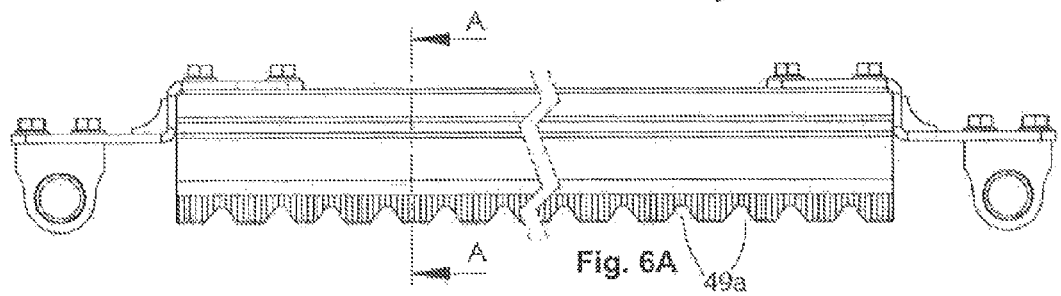
FIGS. 6A, 6B and 6C show various embodiments of cleaning devices.
Figure 6B:
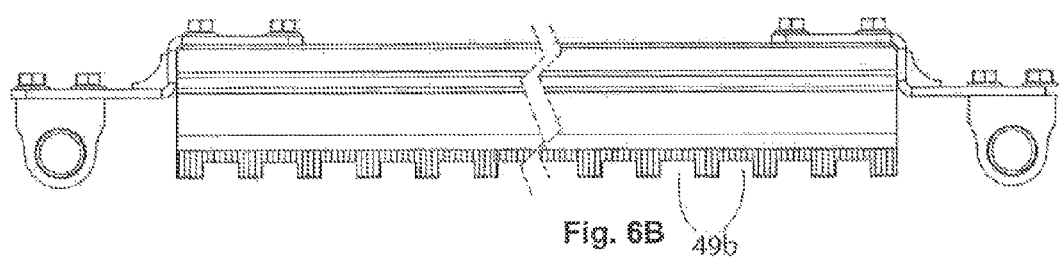
Figure 6C:
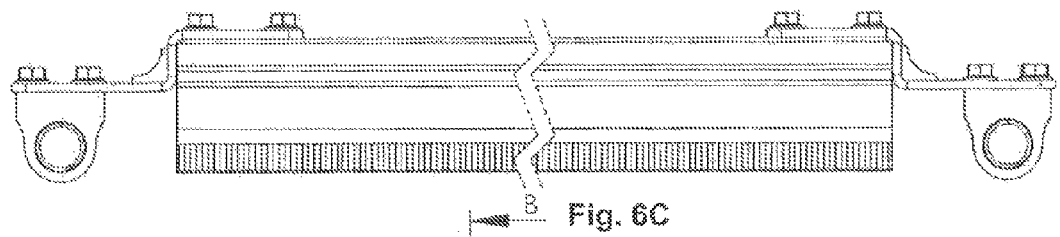

Referring to FIGS. 6A to 6C, various embodiments of cleaning device 40 are shown which differ in the profile of the brush. The brushes of FIGS. 6A and 6B include recesses 49a and 49b which correspond to the shape of the grill bars of the grill plate. These profiles therefore aim to improve the cleaning action between the bars of the grill plate. FIG. 6C shows a brush with a uniform profile as seen in FIG. 4.

Figure 6D:
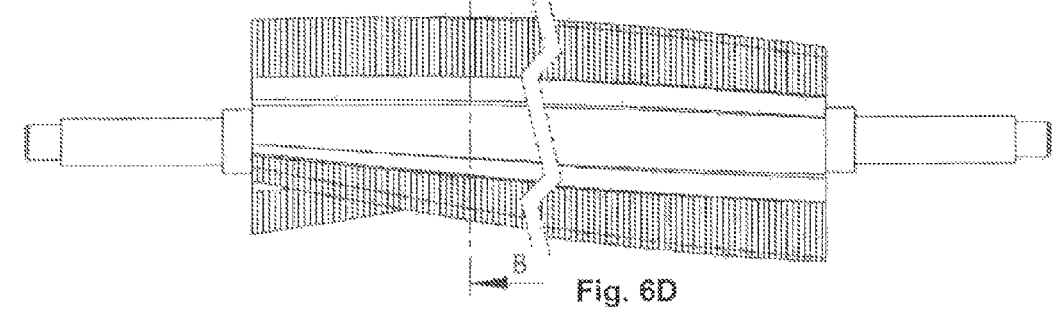
FIG. 6D shows an embodiment of a rotating type of cleaning device.

FIG. 6D shows an alternative type of cleaning device 140 which is configured to rotate as it moves across the grill plate to enhance the cleaning operation. Cleaning device 140 includes three radially spaced curved brushes 147.

Referring to FIGS. 7 to 7B, a movement mechanism for the cleaning device 140 of FIG. 6D is shown. It is somewhat similar to the mechanism shown in FIG. 4, but additionally includes lead screws 160, 162 which are driven by the existing lead screws 50, 52 by way of gears 161, 163. Cleaning device 140 is rotatably mounted between threaded blocks 42, 44. Gears 164, 168 engage with lead screws 160, 162 to cause rotation of cleaning device 140 as it moves across the grill plate.

Figure 8A:
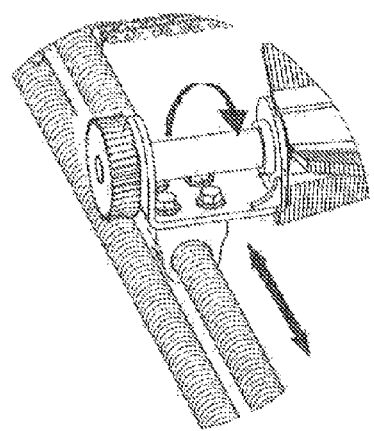
FIG. 8A is detail A of FIG. 8.
Figure 8B:
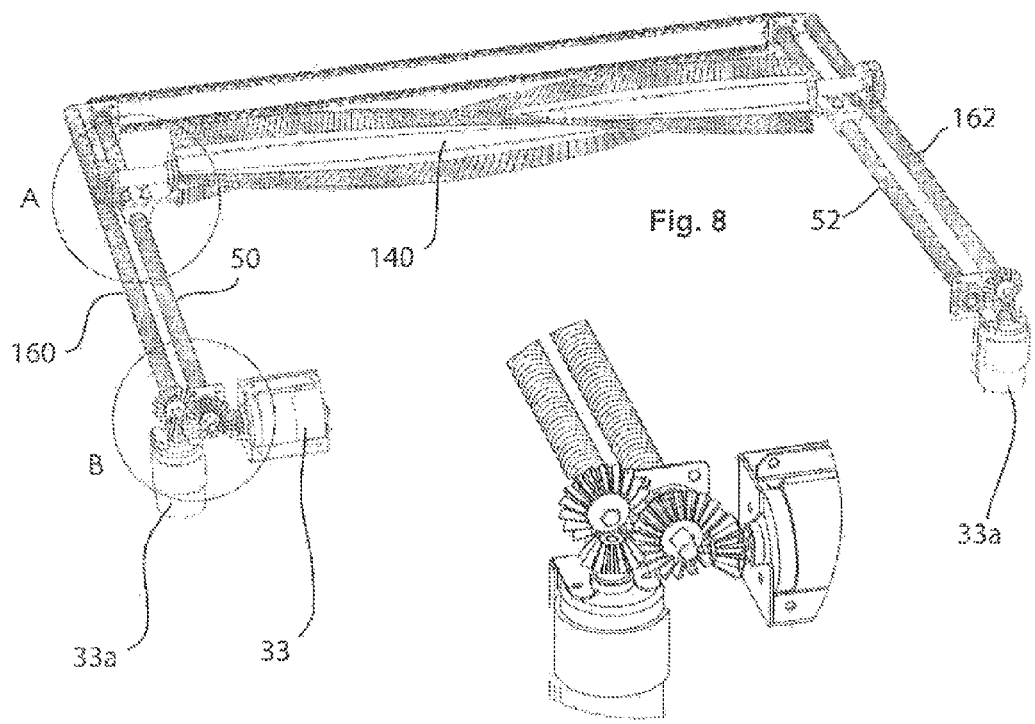
FIG. 8B is detail B of FIG. 8.

Referring to FIGS. 8 to 8B, an alternative version of a movement mechanism for use with a rotating cleaning device is shown. This embodiment is somewhat similar to that shown in FIG. 7, but instead of the lead screws 50, 52 driving lead screws 160, 162, they are instead driven by two synchronised auxiliary motors 33a.

Figure 9A:
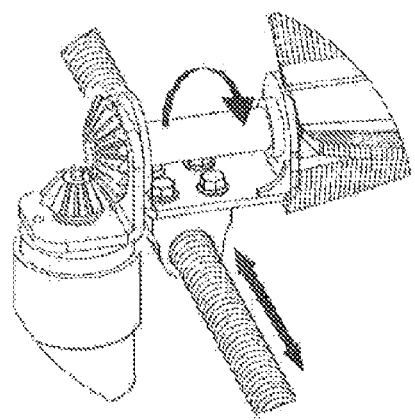
FIG. 9A is detail A of FIG. 9.
Figure 9:
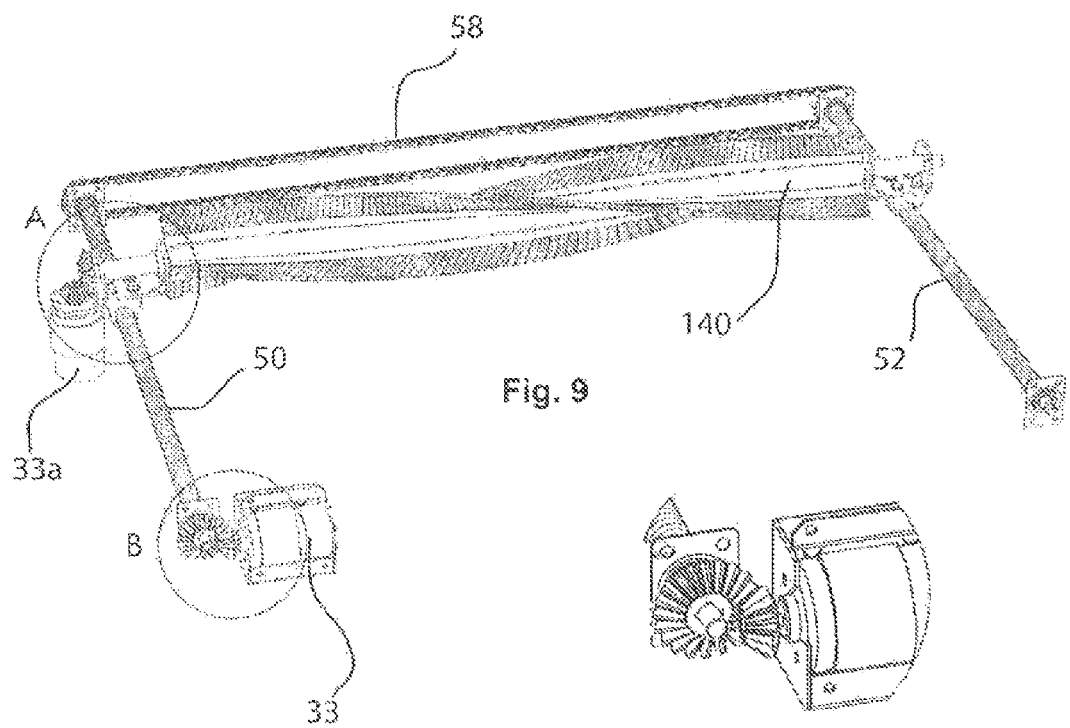
FIG. 9 shows another embodiment of a movement mechanism for use with the cleaning device of FIG. 6D.

Referring to FIGS. 9 to 9B, a further alternative version of a movement mechanism for a rotating cleaning device is shown. This version is somewhat similar to the version shown in FIG. 8, except the lead screws 160, 162 have been dispensed with and auxiliary motor 33a directly drives the rotation of the cleaning device 140 and moves with the cleaning device.

Referring to FIGS. 10, 10A, 11 and 11A a selector module 138 similar to the selector module 38 of FIG. 2 is shown in detail. Rotation of selector knob 30 causes rotation of cam element 170. This in turn causes movement of gear selector 172 between a first position as shown in the figure in which crown gear 180 (being the output of motor 34) engages with bevel gear 176 and a second position in which crown gear 180 engages with bevel gear 174. When crown gear 180 is engaged with bevel gear 176 the motor is caused to drive, via a set of reduction gears, the output dog 32. This output dog 32 is used to power various removable accessories as will be later described.

Figure 12:
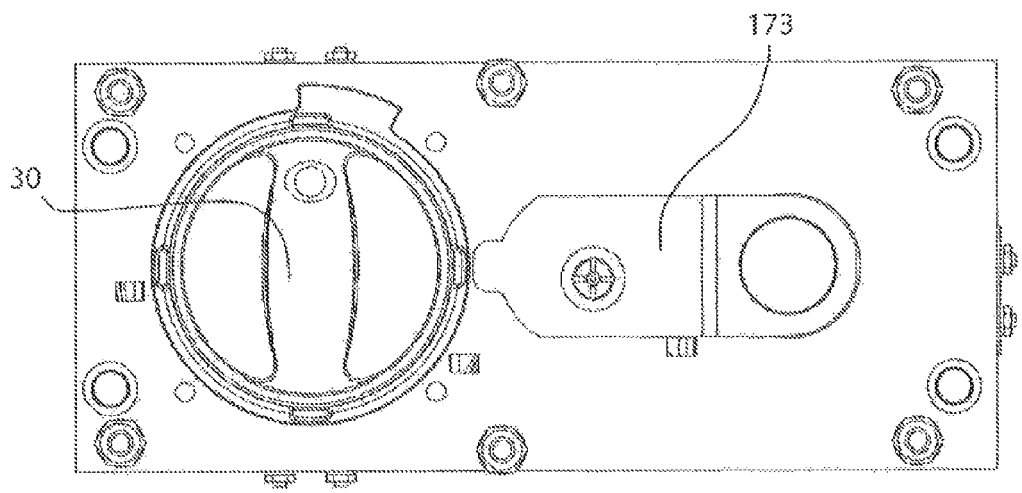
FIGS. 12 and 13 are front views of the selector mechanism of FIG. 10.
Figure 13:
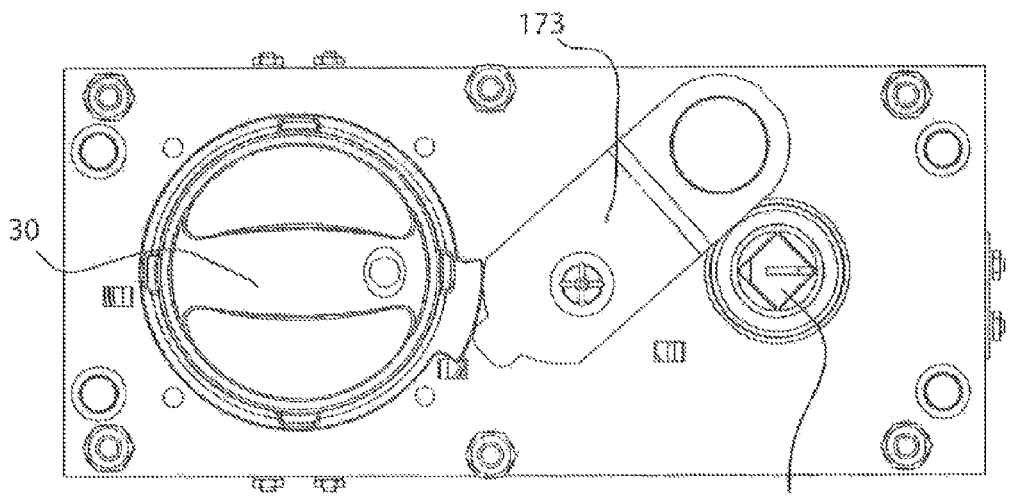
Figure 14:
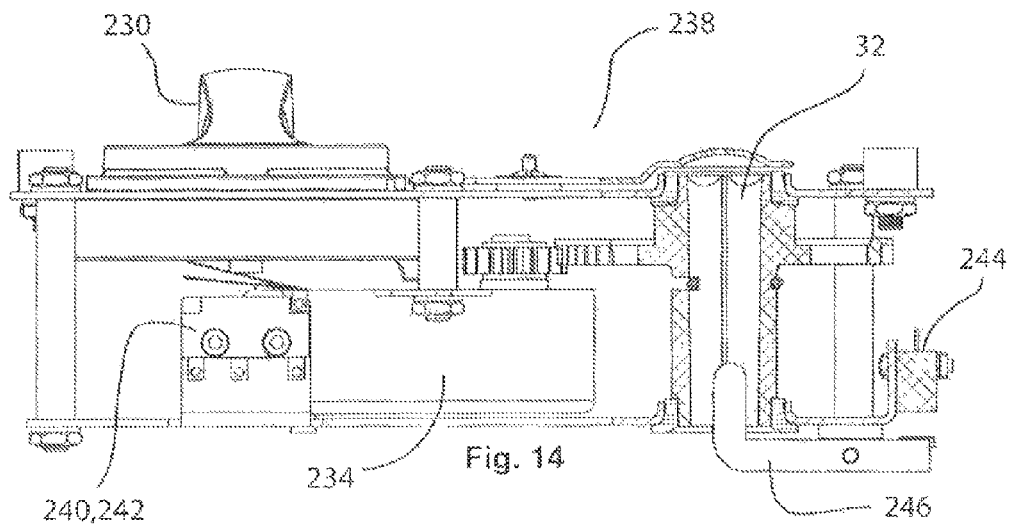
FIG. 14 is a top partially cross sectional view of another embodiment of a selector module.
Figure 15:
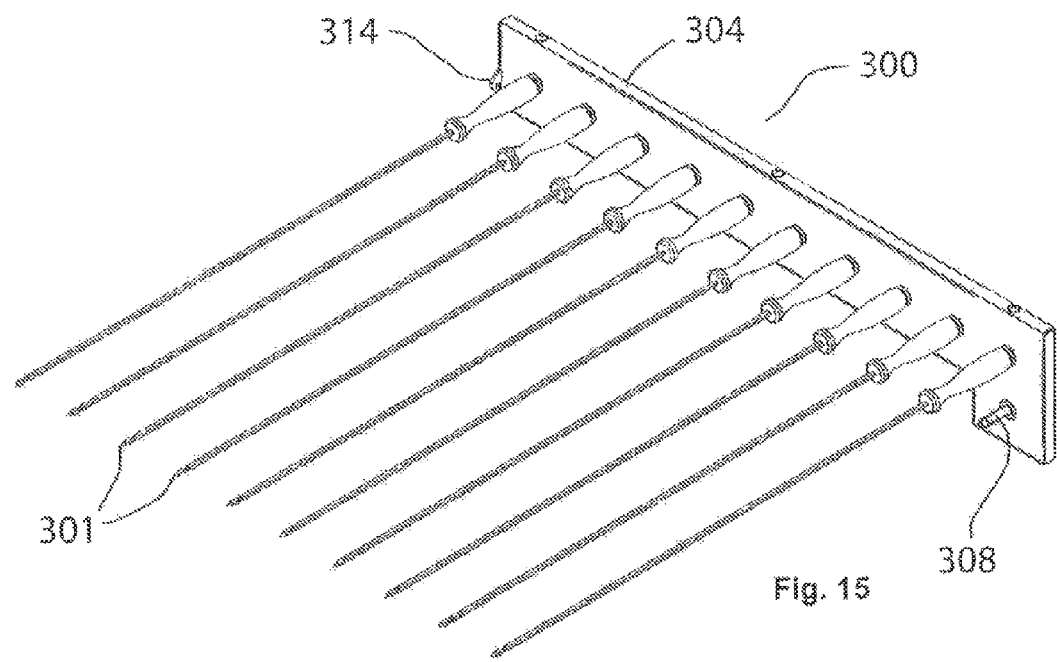
FIG. 15 is a perspective view of a removable skewer accessory for use with the barbeque of FIG. 1.
Figure 16:
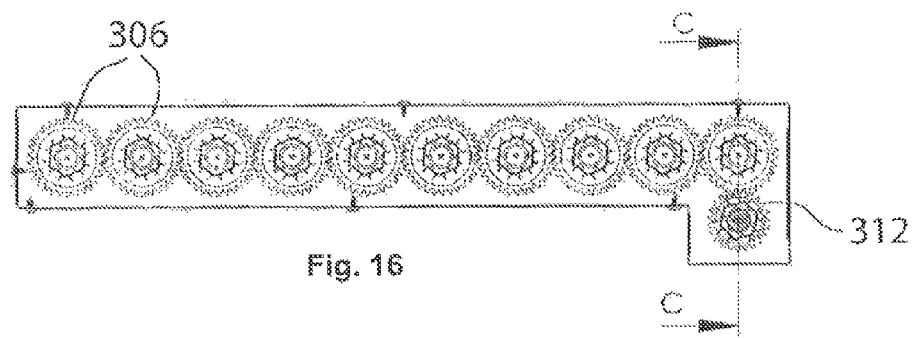
FIG. 16 is a cut away view of the skewer accessory of FIG. 15.
Figure 17:
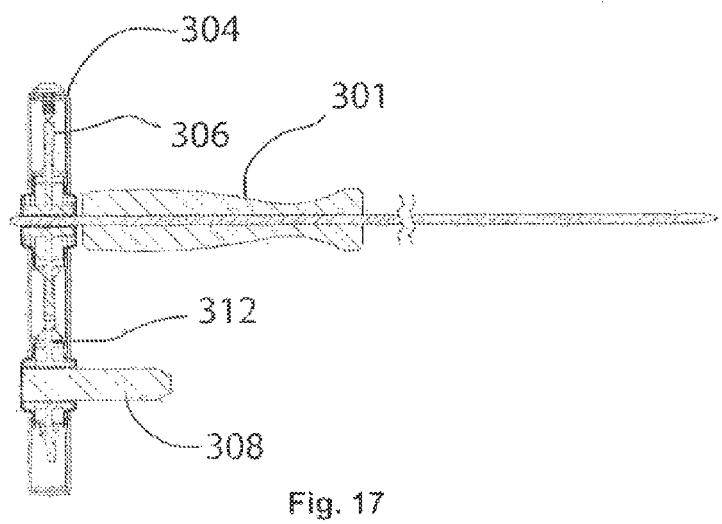
FIG. 17 is section C-C of FIG. 16.
Figure 18:
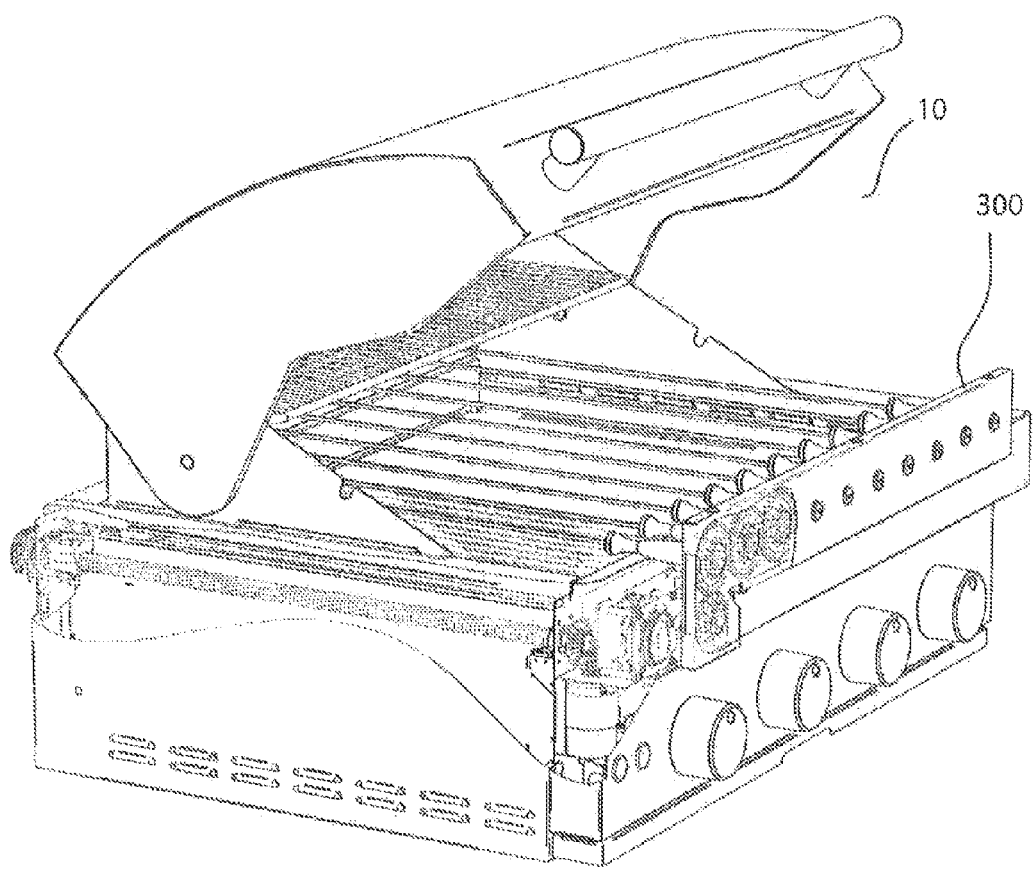
FIG. 18 shows the skewer accessory of FIG. 15 in use in conjunction with the barbeque of FIG. 1.

When crown gear 180 is engaged with bevel gear 174 the motor is caused to drive the previously described cleaning mechanism. The selector module 138 therefore allows a user to select whether they wish to use the cleaning mechanism, or the output dog, and motor 34 is used to drive both options. Microswitches 182, 184 detect whether the selector knob 30 has been moved to select operation of either the cleaning mechanism or the output dog 32. This prevents the cleaning mechanism being activated whilst accessories are used Referring to FIGS. 12 and 13, the output dog 32 is obscured by a rotating cover 173 when not in use. When the selector knob 30 is turned to select use of the output dog, then this causes rotation of the cover 173 to expose the output dog, allowing insertion of accessories only if the cleaning mechanism is not active Referring to FIG. 14, an alternative embodiment of a selector module 238 is shown. This version is intended for use where two different motors are used to drive the cleaning mechanism and the output dog. A pair of microswitches 240, 242 are used to detect when the selector knob 230 is put into either the position to select the cleaning mechanism or the use of the auxiliary output dog 32. A microswitch 244 is provided to detect the insertion of the driven part of an accessory into the output dog 32. When inserted, the driven part pushes lever 246 to close microswitch 244. This arrangement prevents the cleaning mechanism to engage, if an accessory is inserted. In this embodiment, the output dog is driven by a geared motor 234.

Referring to FIGS. 15 to 18 a removable skewer accessory 300 is shown for use with barbeque 10. An array of skewers are rotatably mounted at one end to housing 304. Inside the housing each skewer 301 is affixed to the centre of a gear 306. The gears of adjacent skewers mesh together. An input shaft 308 is dimensioned to directly engage with the output dog 32 of barbeque 10. The input shaft 308 drives a gear 312 mounted inside housing 304 which in turn causes the simultaneous rotation of all of the gears 306 and thus rotation of skewers 301. Referring also to FIG. 1, skewer accessory 300 fits to the barbeque by engaging the input shaft 308 with output dog 32. A small hook 314 engages with a small aperture 316 provided on the barbeque 10 and the free ends of skewers 301 engage with a row of holes 310 provided at the rear wall of the cooking area of barbeque 10. The skewers 301 may be removably mounted to the gears 306 so that they can be more easily handled for loading them with food items and for cleaning purposes. Either all or some of the skewers 301 may be used at any one time, according to the requirements of the user.

Figure 19:
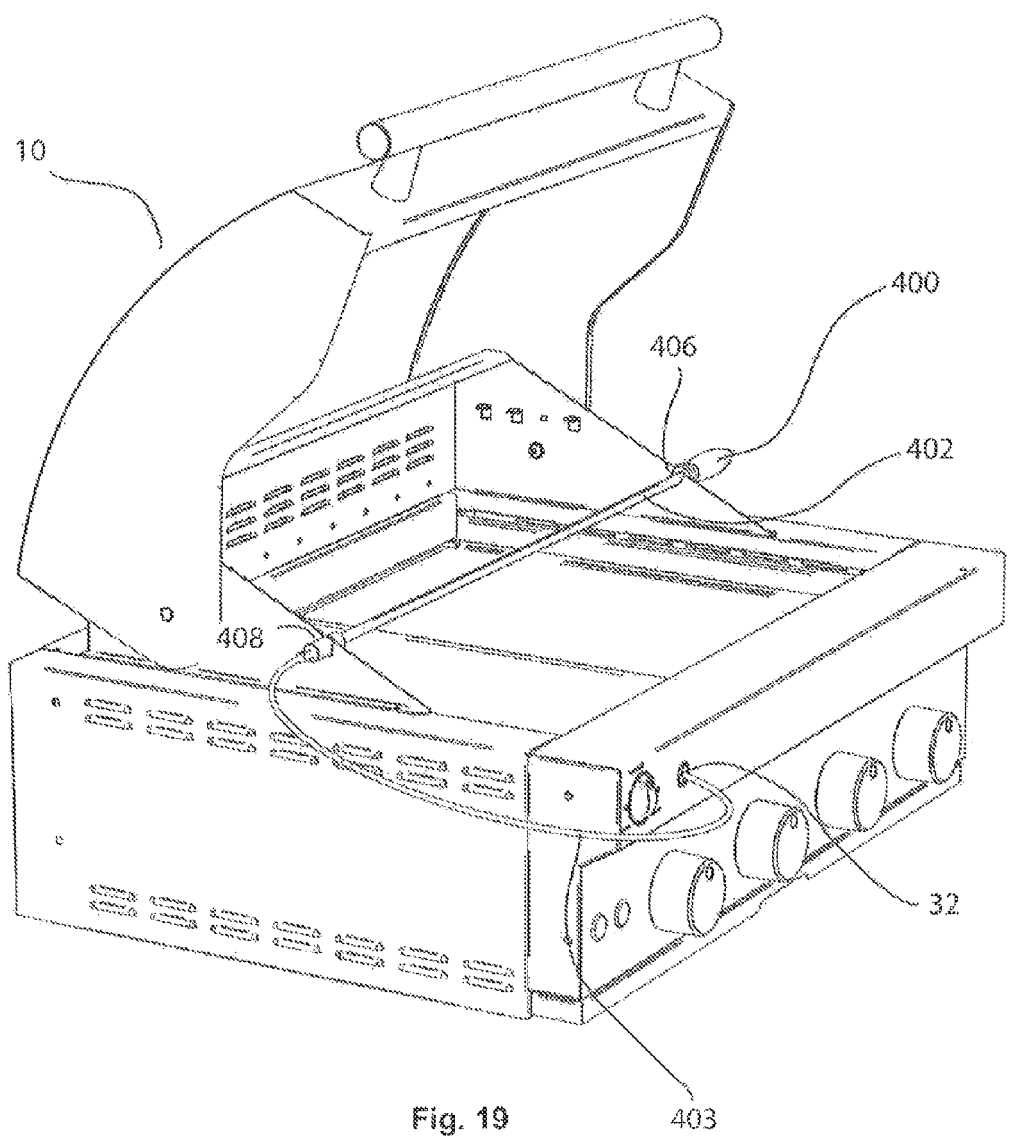
FIG. 19 shows a removable rotisserie accessory in use with the barbeque of FIG. 1.

Referring to FIG. 19, a removable rotisserie accessory 400 is shown attached to barbeque 10. Rotisserie accessory 400 includes a rigid shaft portion 402 which is used to mount food items to be rotated on the rotisserie. A flexible drive cable 403 is fitted at one end to the rigid shaft 402 and the other end is dimensioned to be inserted into output dog 32. The shaft portion 402 is rotatably mounted at either end in apertures 408, 406 provided on barbeque 10. Rotation of the output dog 32 therefore causes rotation of the rotisserie shaft 402.

Figure 19A:
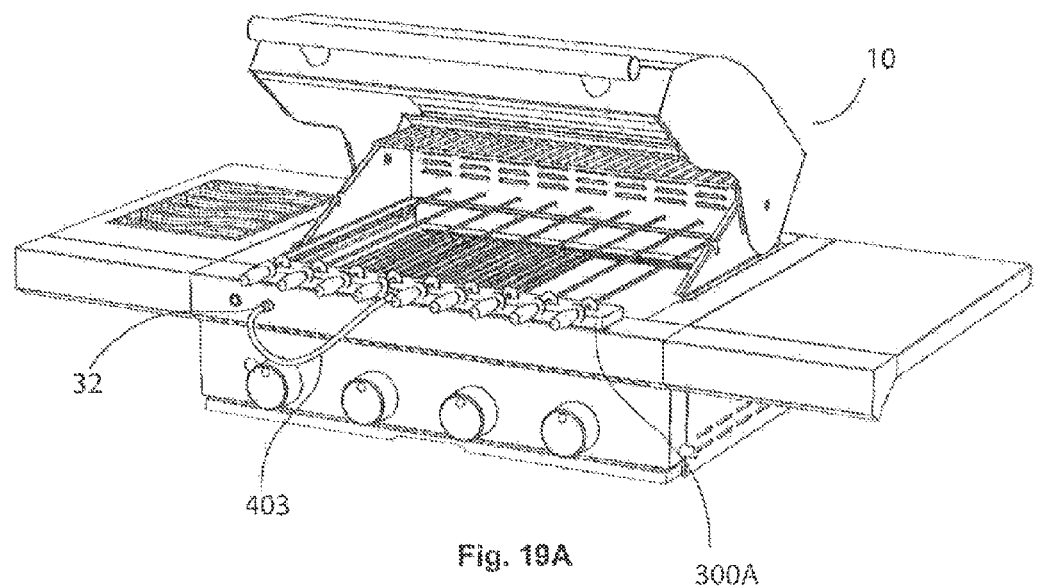
FIGS. 19A to 19D show alternative options for rotatably driven accessories.

Referring to FIG. 19A an alternative embodiment of an arrangement of rotatable skewers 300A is shown. In this version drive is transferred to the skewers by way of flexible drive cable 403 attached to output dog 32.

Figure 19B:
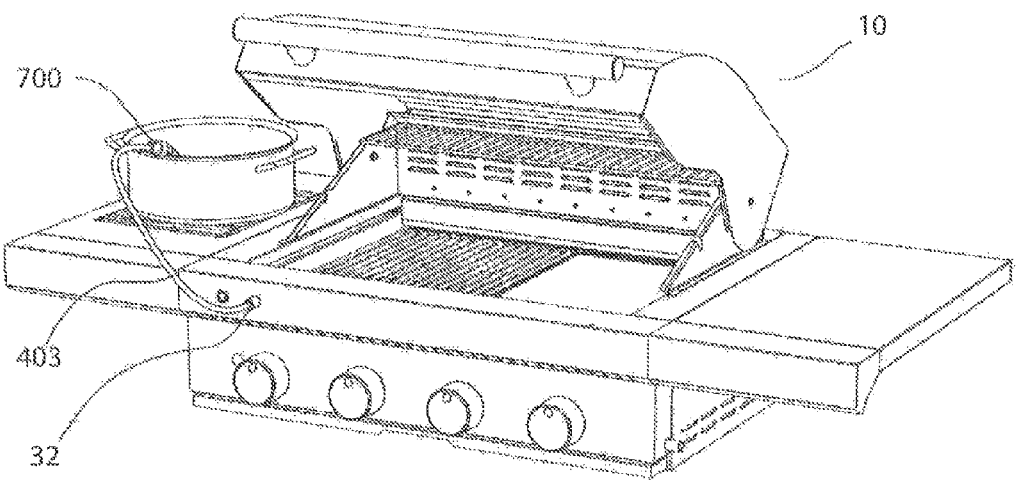

Referring to FIG. 19B, another accessory is shown in the form of a stirring device 700 which is driven by way of the flexible drive cable 40 and can be used to stir the contents of a pot or the like.

Figure 19C:
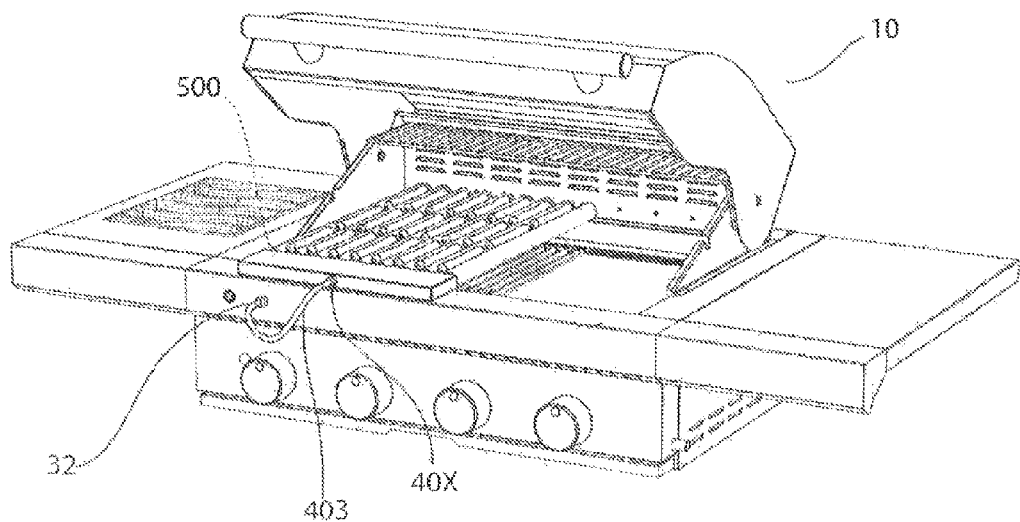

Referring to FIG. 19C, another accessory is shown in the form of an arrangement of rotating cylinders 500 which can be used to support and rotate a number of hot dogs. Drive is supplied to rotate the cylinders by flexible drive cable 403.

Figure 19D:
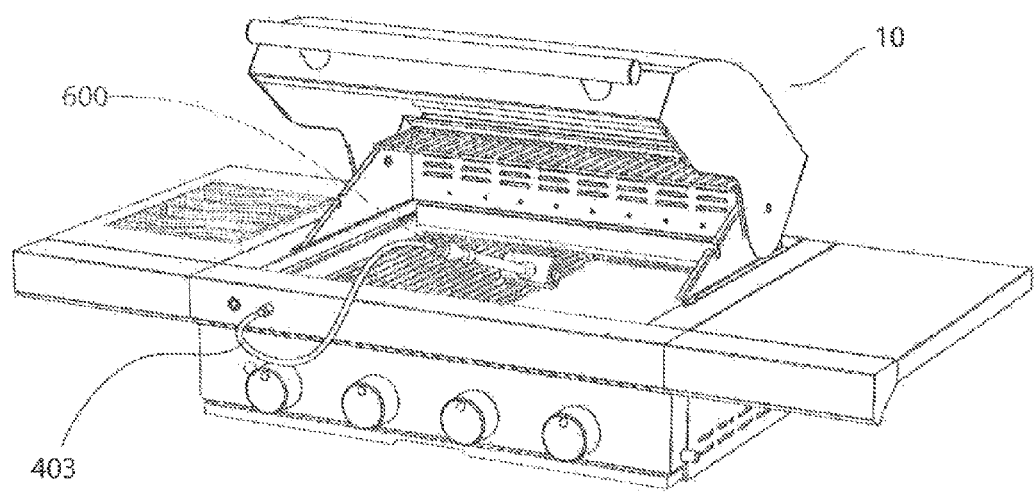
Figure 20:
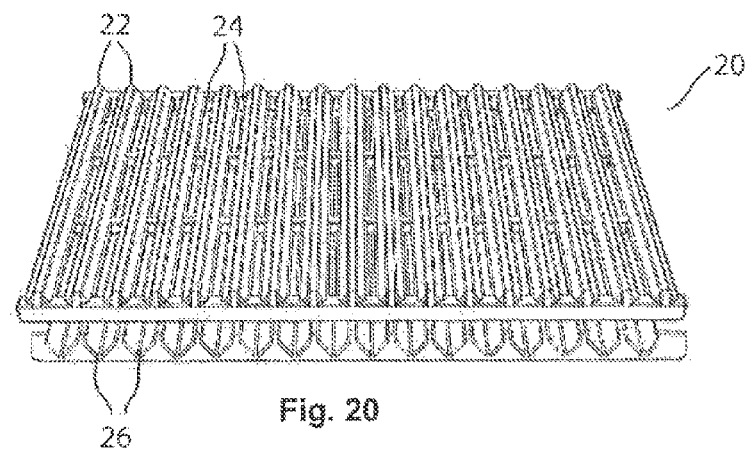
FIG. 20 is a front view of the grill plate of the barbeque of FIG. 1 shown in conjunction with a drainage channel of the cooking apparatus of FIG. 1.
Figure 21:
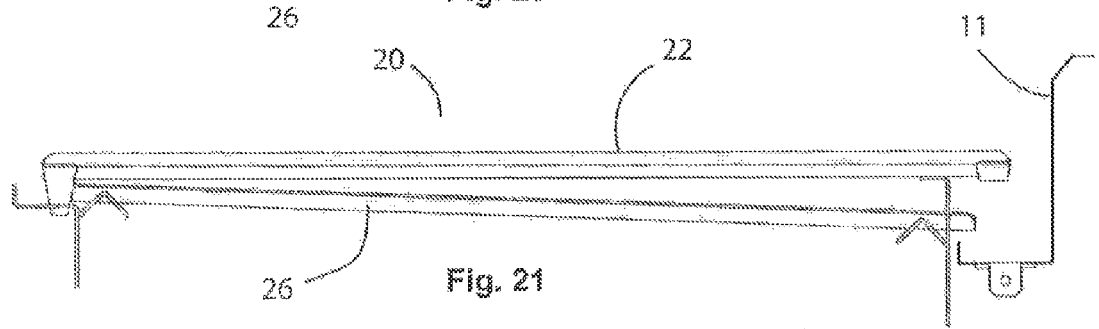
FIG. 21 is a side view of the grill plate of FIG. 20 shown in conjunction with a drainage channel tray of the barbeque of FIG. 1.
Figure 22:
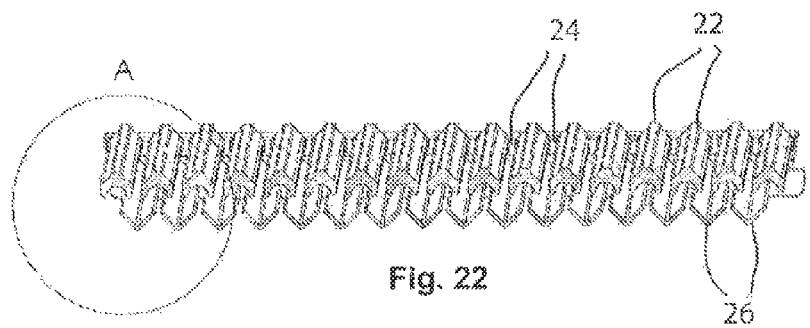
FIG. 22 is a cut away view of the grill plate of FIG. 20.

Referring to FIG. 19D, another accessory is shown in the form of a hand held cleaning brush 600. The head of the brush is driven to rotate by way of flexible drive cable 403.

Referring to FIGS. 20 to 23 a grill arrangement including grill plate 20 is shown. Grill plate 20 includes an array of grill bars 22 separated by longitudinal grill apertures 24. An array of channels 26 is disposed beneath the apertures 24, with each channel 26 positioned and fixed in place below an aperture 24. The channels are themselves separated by apertures. The grill plate 20 is assembled and located on top of the collector/drainage channels and the channels are angled downwardly towards the front of the grill plate. The channels 26 collect fat and other cooking liquids and guide the liquids towards drainage channel tray 11 which forms part of the structure of barbeque 10. Liquid that enters the drainage channel 11 is directed towards a removable catchment container (not shown).

Figure 23:
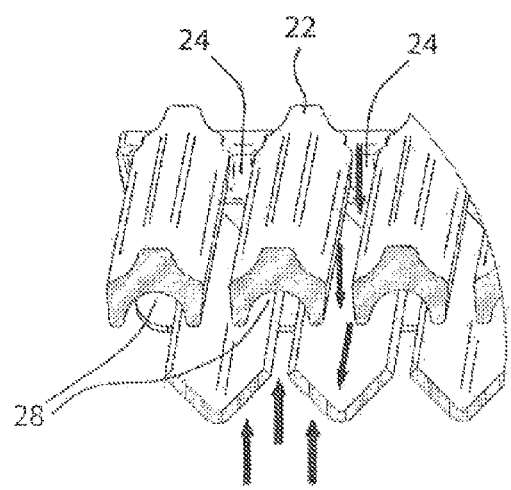
FIG. 23 is detail A of FIG. 22.

Referring to FIG. 23, heat from the gas burners travels up through the apertures between the drainage channels. The grill bars 22 are provided with longitudinal apertures in their undersides being concave recesses 28. These recesses capture heat emitted by the gas burners to enhance the heating of grill bars 22. Furthermore, the drainage channels capture the convection heat (that otherwise would be lost in the ambient above) and distribute this heat under the concave portion of the grill bars making the grill bars hotter and more efficient.

Figure 24:
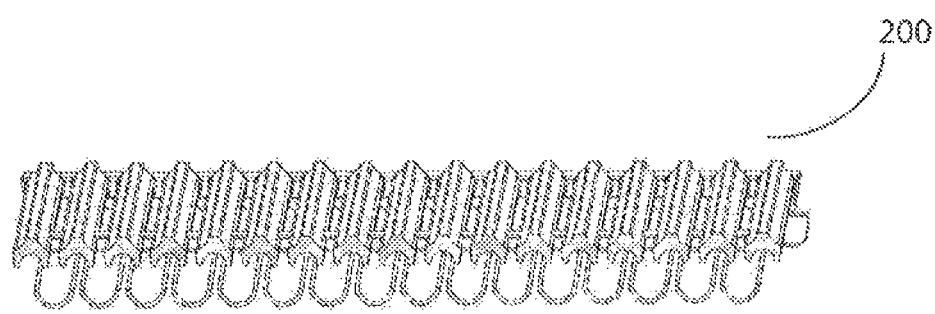
FIGS. 24 and 25 show cut away views of alternative embodiments of grill plates.

Referring to FIG. 24, an alternative embodiment of a grill arrangement 200 is shown. This embodiment differs from the embodiment shown in FIG. 20 in that the channels are hemispherical in cross section.

Figure 25:
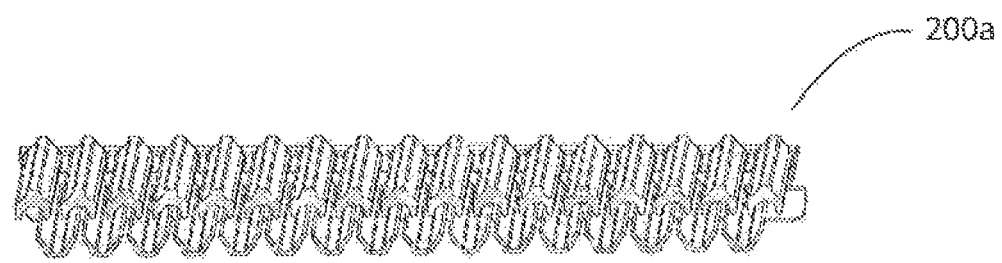

Referring to FIG. 25, an alternative embodiment of a grill arrangement 200a is shown. This embodiment differs from the embodiment shown in FIG. 20 in that the channels have flattened base regions.

The embodiments above related to an outdoor cooking apparatus in the form of a gas barbeque. Similarly, the invention could be embodied in other types of cooking apparatus including charcoal, wood burning or electric powered barbeques or grills.

Some embodiments of the invention described above utilised lead screws with threaded blocks mounted to the lead screws. In other embodiments the lead screws may be replaced with ball screws and the threaded blocks replaced by ball nuts.

In the embodiments described above two start buttons 15 were depressed to activate the cleaning mechanism or attached accessory. In other embodiments a single button may be used.

The electric motors provided in embodiments of the invention may be powered by mains power supply, batteries or rechargeable batteries.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A cooking apparatus comprising:
   at least one grill element including a cooking surface configured to heat supported foodstuffs thereon;
   a cleaning device for cleaning at least a portion of the cooking surface, the cleaning device is integral to or built into the cooking apparatus and includes a surface cleaning element and a movement mechanism;
   the movement mechanism comprising opposed first and second driveable members, a first end of the surface cleaning element being coupled to and driven by the first driveable member while a second end of the surface cleaning element being coupled to and driven by the second driveable member, and the movement mechanism being arranged for moving the cleaning element across the cooking surface of the at least one grill element whilst the at least one grill element is in place for use on the cooking apparatus; and
   at least one motor for driving the movement mechanism and moving the cleaning element across the cooking surface of the at least one grill element for cleaning the at least one grill element;
   wherein the movement mechanism is further arranged to rotate the cleaning element as the cleaning element moves across the cooking surface of the at least one grill element.

2. The cooking apparatus according to claim 1, wherein the cleaning element includes at least one brush.

3. The cooking apparatus according to claim 1, wherein the cleaning element is generally elongate.

4. The cooking apparatus according to claim 3, wherein the opposite portions of the first and the second driveable members are joined by a mechanical linkage so that movement of one of the first and the second driveable members is translated to equivalent movement to the other of the first and the second driveable members.

5. The cooking apparatus according to claim 3, wherein the first and the second driveable members are each driven by a respective motor.

6. The cooking apparatus according to claim 1, wherein the movement mechanism includes lead or ball screws and the cleaning element is mounted to the lead or ball screws by way of threaded blocks or ball nuts.

7. The cooking apparatus according to claim 1, wherein the cooking apparatus further including at least one switch to detect a position of the cleaning device.

8. The cooking apparatus according to claim 1, wherein the cleaning element is slidably mounted on rails and the first and the second driveable members comprise drive belts or chains which are arranged to move the cleaning element along the rails.

9. The cooking apparatus according to claim 1, wherein the at least one motor is mounted below the movement mechanism and drives the movement mechanism by way of a drive belt or a chain.

10. The cooking apparatus according to claim 1, wherein the at least one motor is further arranged to drive an output drive which drives at least one removable accessory.

11. The cooking apparatus according to claim 1, wherein the cooking apparatus further including a removable accessory which is connectable to an output drive of the at least one motor by way of a flexible drive cable or by direct engagement.

12. The cooking apparatus according to claim 11, wherein the removable accessory includes any one of a rotisserie, an arrangement of rotating skewers, an arrangement of rotating cylinders, a stirring device or a hand held cleaning device.

13. A cooking apparatus comprising:
   at least one grill element including a cooking surface configured to heat supported foodstuffs thereon;
   a cleaning device for cleaning at least a portion of the cooking surface, the cleaning device is integral to or built into the cooking apparatus and includes a grill element surface cleaning element and a movement mechanism for moving the cleaning device, and the cleaning device extending across a width of the at least one grill element from a first lateral edge to an opposed lateral edge;
   the movement mechanism comprising a first driveable member located along the first lateral edge of the at least one grill element and a second driveable member located along the second lateral edge of the at least one grill element, a first portion of the surface cleaning element being coupled to and driven by the first driveable member while a second portion of the surface cleaning element being coupled to and driven by the second driveable member, and the movement mechanism being arranged for moving the cleaning element across the cooking surface of the at least one grill element whilst the at least one grill element is in place for use on the cooking apparatus; and
   at least one motor for driving the movement mechanism and moving the cleaning element across the cooking surface of the at least one grill element for cleaning the at least one grill element;
   wherein the movement mechanism is further arranged to rotate the cleaning element as the cleaning element moves across the cooking surface of the at least one grill element.

* * * * *